United States Patent
Wettling et al.

(10) Patent No.: US 6,846,903 B2
(45) Date of Patent: Jan. 25, 2005

(54) METHOD FOR PRODUCING POLYISOBUTYLENES

(75) Inventors: Thomas Wettling, Limburgerhof (DE); Dirk Borchers, Kapellen (DE); Wim Verrelst, Edegem (DE); Hans Peter Rath, Gruenstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/312,591

(22) PCT Filed: Jul. 13, 2001

(86) PCT No.: PCT/EP01/08109
§ 371 (c)(1),
(2), (4) Date: Jan. 21, 2003

(87) PCT Pub. No.: WO02/06359
PCT Pub. Date: Jan. 24, 2002

(65) Prior Publication Data
US 2003/0191257 A1 Oct. 9, 2003

(30) Foreign Application Priority Data
Jul. 18, 2000 (DE) .......................................... 100 35 298

(51) Int. Cl.$^7$ ................................................. C08F 6/02
(52) U.S. Cl. ........................ 528/482; 528/492; 526/237; 585/525; 585/823
(58) Field of Search .................... 526/237, 83; 528/482, 528/492; 585/823, 525, 820

(56) References Cited

U.S. PATENT DOCUMENTS

| 2,291,510 A | | 7/1942 | Dahlke et al. |
|---|---|---|---|
| 4,213,001 A | | 7/1980 | Madgavkar et al. |
| 4,384,162 A | | 5/1983 | Vogel et al. |
| 4,433,197 A | | 2/1984 | Vogel et al. |
| 4,547,620 A | * | 10/1985 | Miyata et al. .............. 585/852 |
| 5,196,630 A | | 3/1993 | Agrawal et al. |
| 5,286,823 A | * | 2/1994 | Rath .......................... 526/237 |
| 5,556,932 A | | 9/1996 | Rath et al. |

FOREIGN PATENT DOCUMENTS

| DE | 27 02 604 | 7/1978 |
|---|---|---|
| EP | 0 145 235 | 6/1985 |
| EP | 0 322 241 | 6/1989 |
| EP | 0 628 575 | 12/1994 |
| EP | 0 791 557 | 8/1997 |
| WO | 01 30868 | 5/2001 |

OTHER PUBLICATIONS

H. Guetterbock Polyisobutylen und Isobutylen–Mischpolymerisate, Springer–Verlag, Berlin, pp. 77–104 1959.

Puskas et al J. Polymer Sci.: Symposium No. 56, pp. 191–202 1976.

* cited by examiner

*Primary Examiner*—Fred Teskin
(74) *Attorney, Agent, or Firm*—Oblon, Spivak, McClelland, Maier & Neustadt, P.C.

(57) ABSTRACT

Polyisobutenes are prepared by cationic polymerization of isobutene or isobutene-containing hydrocarbon streams in the liquid phase in the presence of boron trifluoride as a catalyst, the catalytic activity of the boron trifluoride being partially or completely eliminated at a desired time by means of a solid deactivator, by a process in which the solid deactivator has boron trifluoride-binding primary, secondary, tertiary and/or quaternary nitrogen atoms and is insoluble in the reaction mixture.

15 Claims, No Drawings

METHOD FOR PRODUCING POLYISOBUTYLENES

BACKGROUND OF THE INVENTION

1. Field of the Invention

The present invention relates to a process for the preparation of polyisobutenes by cationic polymerization of isobutene or isobutene-containing hydrocarbon streams in the liquid phase in the presence of boron trifluoride as a catalyst, the catalytic activity of the boron trifluoride being eliminated at a desired time by means of a solid deactivator.

2. Description of the Background

High molecular weight polyisobutenes having molecular weights of up to several 100 000 Dalton have long been known, and their preparation is described, for example, in H. Güterbock: Polyisobutylen und Mischpolymerisate, pages 77 to 104, Springer Verlag, Berlin 1959. The highly reactive polyisobutenes, which as a rule have average molecular weights of from 500 to 5 000 Dalton and a high content of terminal double bonds, i.e. vinylidene groups, of, preferably, substantially more than 60 mol %, can be distinguished from these conventional polyisobutenes.

Such highly reactive polyisobutenes are used as intermediates for the preparation of additives for lubricants and fuels, as described, for example, in DE-A 27 02 604. For the preparation of these additives, polyisobutene/maleic anhydride adducts, in particular polyisobutenyl/succinic anhydrides, are first produced by reacting the terminal double bonds of the polyisobutene with maleic anhydride and are then reacted with specific amines to give the final additive. The amount of terminal vinylidene groups in the molecule is one of the most important quality criteria for this type of polyisobutene, since it is mainly the terminal vinylidene groups which react in the adduct formation with maleic anhydride, whereas, depending on their position in the macromolecule, the double bonds present further toward the interior of the macromolecule lead to substantially lower conversion, if any at all, without the addition of halogens.

A concept for the formation of the terminal vinylidene groups and the isomerization of the terminal double bonds in the isobutene macromolecules to give internal double bonds is described, for example, in the article by Puskas et al., J. Polymer Sci.: Symposium No. 56 (1976), 191 or EP-A 628 575. The protonations, deprotonations and rearrangements taking place are equilibrium reactions in which the formation of more highly alkyl-substituted cations is thermodynamically favored. Said reactions are as a rule promoted by traces of acid, in particular by the usual Lewis acid catalyst of the polymerization itself.

A further quality criterion for polyisobutenes having said intended use is their average molecular weight ($M_n$).

The molecular weight distribution (dispersity, D) of the polyisobutene macromolecules is also a quality criterion for said purpose, since the broader it is, i.e. the greater the scatter of the molecular weights of the polyisobutene macromolecules, frequently the less suitable are the products for the abovementioned purpose.

A person skilled in the art is familiar with a number of processes for the preparation, from isobutene, of reactive polyisobutenes having average molecular weights and dispersities which meet said requirements, in which processes boron trifluoride is used as a catalyst.

Boron trifluoride is used predominantly in the form of donor complexes, in particular with water, alcohols, phenols, carboxylic acids, carboxylic anhydrides, hydrogen fluoride, ethers or mixtures of these compounds. Boron trifluoride, as such or in the form of said complexes, is a catalyst which is extremely effective even at low temperatures (cf. for example DE-A 27 02 604, EP-A 145 235 or EP-A 322 241).

Therefore, if it is intended to terminate the boron trifluoride-catalyzed reaction of the isobutene after a defined conversion and/or a defined selectivity with respect to the macromolecular products has been established, the boron trifluoride must as rule be rapidly and completely deactivated. This deactivation generally comprises decomposing the boron trifluoride with liquid substances or with substances which are soluble in the reaction medium or converting it into other donor complexes in such a way that it is virtually completely withdrawn from the reaction.

In the prior art, for example, alcohols and acetonitrile are used for such complex-forming deactivation of the boron trifluoride with the chemical organic deactivators in the liquid phase (cf. for example DE-A 43 06 384, EP-A 145 235).

A common feature of the known methods for deactivating the boron trifluoride is that they necessitate the elimination or working up of large amounts of liquid which are contaminated with boron trifluoride, its decomposition products and/or organic compounds. When alcohols are used for the deactivation, corrosive hydrogen fluoride may furthermore be formed by reaction with the boron trifluoride, necessitating the use of high-quality and expensive materials for the design of the apparatuses used.

In view of this situation, solutions employing solid deactivators for the boron trifluoride have been developed.

For this purpose, U.S. Pat. No. 4,384,162 proposes withdrawing the boron trifluoride from the reaction solution by means of solid polyvinyl alcohol. However, the process has the disadvantage that it does not meet the requirements for the polymerization of isobutene because, in spite of the adsorption onto the polyvinyl alcohol, the boron trifluoride retains some of its activity and consequently undesired oligomers may be formed subsequently.

U.S. Pat. No. 4,433,197 discloses using silica gel for the same purpose. However, this deactivation, too, is not sufficiently complete. U.S. Pat. No. 4,213,001 even describes the use of boron trifluoride/silica gel as a catalyst for the oligomerization of 1-olefins, which indicates that the boron trifluoride is still catalytically active even after the adsorption.

SUMMARY OF THE INVENTION

It is an object of the present invention to provide a process for the preparation of highly reactive polyisobutene from isobutene in the presence of boron trifluoride as a catalyst, which process employs a solid deactivator for the boron trifluoride, which withdraws the boron trifluoride from the reaction more effectively than the known deactivators of this type.

We have found that this object is achieved by a process for the preparation of polyisobutenes by cationic polymerization of isobutene or isobutene-containing hydrocarbon streams in the liquid phase in the presence of boron trifluoride as a catalyst, the catalytic activity of the boron trifluoride being partially or completely eliminated at a desired time by means of the solid deactivator, wherein the solid deactivator has boron trifluoride-binding primary, secondary, tertiary and/or quaternary nitrogen atoms and is insoluble in the reaction mixture.

DESCRIPTION OF THE PREFERRED EMBODIMENTS

Here, terminal vinylidene groups or terminal double-bonds are understood as meaning those double bonds whose position in the polyisobutene macromolecule is described by the formula I

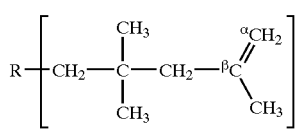

where R is the remaining part of the polyisobutylene macromolecule. The type and the amount of the double bonds present can be determined with the aid of $^{13}$C-NMR spectroscopy, the two carbon atoms of the terminal double bond, indicated by α and β in formula I, being identifiable in the $^{13}$C-NMR spectrum by their signals at the chemical shifts of 114.4 and 143.6, respectively, relative to tetramethylsilane. The amount of terminal double bonds with respect to other types of double bond is determined by expressing the peak areas of the individual olefin signals in each case as a ratio of the total area integral of the olefin signals.

The highly reactive polyisobutenes obtainable by the novel process generally have substantially more than 60, preferably from 75 to 100, especially from 80 to 95, mol % of vinylidene groups.

Here, the average molecular weight is defined as the number average molecular weight $M_n$, which can be determined, for example, with the aid of gel permeation chromatography, by ozonolysis or by means of vapor pressure osmometry.

The highly reactive polyisobutenes obtainable by the novel process generally have average molecular weights of from 300 to 50 000, preferably from 500 to 30 000, in particular from 500 to 25 000, Dalton.

For the preparation of highly reactive polyisobutenes from isobutene in the presence of boron trifluoride, usually either the required amount of preformed boron trifluoride complex solution or suspension is distributed in the isobutene or alternatively the catalyst is produced in situ by passing gaseous boron trifluoride into a mixture of isobutene and the complexing agent for the boron trifluoride. The catalytically active system comprising boron trifluoride and the complexing agent formed in one of said ways is referred to below as catalyst system.

For the purposes of the novel process, suitable complexing agents for the boron trifluoride are alcohols such as isopropanol and preferably methanol (cf. EP-A 628 575) and tertiary ethers.

Usually, the catalyst system is used in amounts of from 0.05 to 1% by weight, based on the weight of the isobutene used. The overall reaction rate is as a rule dependent on the amount of the catalyst system used, but especially on the molar ratio of the catalyst system used.

Pure isobutene as well as mixtures of isobutene with other hydrocarbons may be used as isobutene-containing starting material (referred to below as isobutene feedstock) in the synthesis step preceding the deactivation of the boron trifluoride, the isobutene content of such mixtures expediently being not less than 5% by weight. Preferably, hydrocarbon mixtures having a high isobutene content and a very low butadiene content are used, for example (i) a refined product I, (ii) a partially hydrogenated $C_4$ stream from a steam cracker, (iii) a $C_4$ stream from an isobutane dehydrogenation or (iv) a $C_4$ stream from a refinery, for example an FCC plant.

The isobutene feedstock can be converted into polyisobutene in the presence of the catalyst system in one or more inert solvents. Suitable solvents, individually or as mixtures with one another, are saturated hydrocarbons, for example n-butane, n-pentane, cyclopentane, methylcyclopentane, n-hexane, isooctane or methylcyclohexane, unsaturated hydrocarbons which are unreactive under the reaction conditions, such as 1-butene, cis-2-butene or trans-2-butene, individually or as a mixture, as present, for example, in a refined product II, halogenated hydrocarbons, such as methylene chloride, chloroform and other halohydrocarbon compounds having suitable melting points and boiling points.

The isobutene feedstock may contain small amounts of impurities, such as water, carboxylic acids or mineral acids, without resulting in critical declines in yield or in selectivity in the polymerization. However, it is expedient to avoid an enrichment of these impurities in the reactor by removing such pollutants from the isobutene feedstock, for example by means of adsorption onto solid adsorbents, such as active carbon, molecular sieves or ion exchangers.

The polymerization of the isobutene can be carried out batchwise, semicontinuously or continuously. For this purpose, reactors known per se, such as tubular reactors, tube-bundle reactors or stirred kettles, may be employed. Preferably, the preparation process is carried out in a loop reactor, i.e. a tubular reactor or a tube-bundle reactor with continuous circulation of the reaction mixture, it being possible, as a rule, for the volume ratio of feed to circulation to vary from 1:1 to 1:1 000, preferably from 1:50 to 1:200. Of course, the amount of feed corresponds to the amount of reaction discharge as soon as the polymerization reaction has reached an equilibrium state.

It is expedient, when passing preformed catalyst complexes into the reactor and when preparing them in situ in the reactor, to ensure thorough mixing of all reactants, since high local and steady-state catalyst concentrations in the reactor may give rise to undesirable double bond shifts. Thorough mixing is achieved by suitable internals, such as deflection plates, or by adapted tube cross-sections, which, at a suitable flow rate, lead to an effective, expediently turbulent flow of the reaction mixture in the reactor.

The residence time of the isobutene in the reactor may be from 5 seconds to several hours. Preferably, a residence time of from 1 to 60, particularly preferably from 2 to 30, minutes is chosen.

The polymerization is generally carried out at below 0° C. Although isobutene can be successfully polymerized to highly reactive polyisobutene by means of the catalyst system even at substantially lower temperatures, temperatures of from 0 to −60° C., in particular from 0 to −30° C., particularly preferably from −5 to −20° C., are preferably employed.

Advantageously, the polymerization reaction is operated under isothermal conditions and, in the case of a continuous reaction procedure, with establishment of a constant, steady-state isobutene concentration in the reaction medium. The steady-state isobutene concentration can in principle be freely chosen. As a rule, an isobutene concentration is expediently brought to from 0.2 to 50, preferably from 0.2 to 10, % by weight, based on the total polymerization mixture.

In general, the polymerization is carried out under atmospheric pressure or a pressure slightly higher than atmospheric pressure. The use of superatmospheric pressure, in particular operation under the autogenous pressure of the reaction system (while maintaining pressure), may be advantageous in terms of process engineering aspects for downstream process stages but is generally unimportant for the result of the polymerization.

Since the polymerization reaction is exothermic, the resulting heat is generally removed with the aid of a cooling apparatus, which may be operated, for example, with liquid ammonia as coolant. Another possibility for heat removal is evaporative cooling, in which heat released is removed by evaporation of the isobutene, of other readily volatile components of the isobutene feedstock and/or of any relevant volatile solvent present, which may be ethylene, ethane, propane or butane, with the result that the temperature remains constant.

The isobutene conversion can in principle be established as desired. However, the cost-efficiency of the process is of course questionable at very low isobutene conversions, whereas with very high isobutene conversions of more than 99% the danger of undesirable secondary reactions, for example of double bond shifts and especially the formation of undesirable oligomers, constantly increases. For these reasons, the isobutene conversion is as a rule from 20 to 99.5%, preferably from 90 to 99%.

The discharge from the reactor (referred to below as discharge for short) generally contains the major part of the boron trifluoride used, in free form or as catalyst system, i.e. as a complex with the originally added complexing agent. However, it is not possible to rule out that a reaction of the boron trifluoride has taken place with other components of the reaction mixture, for example to give an isopropylborane when isopropanol is used as a complexing agent. Owing to the usually small extent of such secondary reactions, however, they are not to be considered further here. Rather, for the sake of simplicity and as a good approximation to the actual circumstances, it is to be assumed that all the boron trifluoride used is still intact as such at the time of the novel deactivation.

For the novel deactivation of the boron trifluoride, the discharge is treated with the solid deactivator.

This deactivation can in principle be carried out batchwise, semicontinuously or continuously. If the polymerization of the isobutene with boron trifluoride is carried out continuously, the boron trifluoride in the discharge is preferably deactivated continuously with the solid deactivator.

Suitable novel solid deactivators are those which contain primary amino groups of the type $R^1$—$NH_2$, secondary amino groups of the type $R^2R^3NH$, tertiary amino groups of the type $R^4R^5R^6N$ and/or quaternary ammonium groups of the type $R^7R^8R^9R^{10}N^+$, in which $R^1$ and at least one of the substituents $R^2$ and $R^3$, at least one of the substituents $R^4$ to $R^6$ and at least one of the substituents $R^7$ to $R^{10}$ are the remaining solid deactivator (carrier). Furthermore, the hydrogen atoms on the nitrogen atom of the primary amines ($R^1$—$NH_2$) and of the secondary amines ($R^2R^3N$—H) and $R^2$, $R^3$, $R^4$, $R^5$, $R^6$, $R^7$, $R^8$, $R^9$ and $R^{10}$ which are not the carrier can, independently of one another, have the following meanings: $C_1$- to $C_{10}$-alkyl, such as methyl, ethyl, n-propyl or n-butyl, $C_6$- to $C_{10}$-aryl, such as phenyl, $C_7$- to $C_{15}$-arylalkyl, such as benzyl or phenethyl, and $C_1$- to $C_8$-alkylcarbonyl, such as acetyl or ethoxycarbonyl.

Carriers for said amino groups and ammonium groups may be inorganic or organic materials which are inert under the reaction conditions. Preferably used are chemical organic polymers which may have a chain-like composition or which can be crosslinked to give planar or three-dimensional structures and which were occupied with corresponding amino groups on the surface after the polymerization, or those based on unsaturated monomers which contained amino groups before the polymerization.

Suitable polymers which were occupied by corresponding amino groups or ammonium groups on the surface (aminated polymers) are: polymers of acrylic acid, methacrylic acid or vinylsilanes or copolymers of such monomers.

Suitable polymers based on unsaturated monomers (amine polymers), the monomers containing the desired amino groups, are: polymers of vinylamines, styrenes having amino groups bonded to the nucleus or acrylamide or copolymers of such monomers. The corresponding deactivators which contain quaternary ammonium groups of the type $R^7R^8R^9R^{10}N^+$ are obtained from the resulting polymers by alkylation of the amino groups in a manner known per se.

Further suitable aminated polymers and amine polymers of these types are known to a person skilled in the art, for example from Ullmann's Encyclopedia of Industrial Chemistry, 5th edition, Vol. A14, page 393 et seq. (Ion Exchangers).

From the group consisting of the aminated polymers and of the amine polymers, weakly basic ion exchangers based on polyamines are very particularly preferred for carrying out the novel process.

The required amount of the novel solid deactivators for boron trifluoride depends on various aspects, especially:
the number of boron trifluoride-binding primary, secondary, tertiary and/or quaternary nitrogen atoms in the deactivator used and
the degree to which the content of boron trifluoride in the reaction discharge is to be decreased.

In practice, it is found that the originally boron trifluoride-free deactivator becomes ladened to saturation with boron trifluoride when sufficient boron trifluoride is available in the form of the reactor discharge. In other words, its deactivation potential thus generally decreases effectively from a maximum to zero. Thereafter, it should be replaced with fresh deactivator, or it has to be regenerated. Accordingly, it is left to the judgment of a person skilled in the art to determine the amounts in which he wishes to use the novel deactivator.

In order to keep the volume of the deactivator and hence the complexity of the apparatus for the deactivation of the boron trifluoride very low, preferred solid deactivators are those which have a large reactive surface area in the context of the novel deactivation.

Commercial materials having this characteristic are, for example, ion exchangers as obtainable under the names Purolite A100, Purolite A103S, Purolite A105, Purolite A830, Purolite A845 and Purolite A835 from Purolite, or as Lewatit MP 62 WS from Bayer AG.

It is also possible to use mixtures of different novel solid deactivators.

For deactivation of the boron trifluoride, the solid deactivator is brought into contact with the discharge in a manner known per se.

For this purpose, the deactivator can be stirred in loose form into the discharge or, conversely, the discharge, preferably in an excess, can be stirred into the loose deactivator. In particular, apparatuses which ensure rapid and complete mixing are used.

From economic points of view, the deactivator is preferably brought into the form of a bed, and the discharge is passed through this bed.

In a preferred embodiment of the novel process, for this purpose the solid deactivator is introduced into a vertically arranged reactor and the discharge is preferably passed through the deactivator bed from above.

In a further preferred embodiment, the novel process is carried out continuously. In particular, the solid deactivator is initially taken in two absorber columns arranged in parallel. The absorber column are operated alternately: while the deactivation is carried out in the first absorber column, the deactivator in the second absorber column is regenerated, or the absorber column laden with boron trifluoride is filled with fresh deactivator.

The deactivation of the boron trifluoride is preferably carried out at the temperature of the polymerization, especially at from 0 to $-30°$ C., in particular from 0 to $-25°$ C. Deactivation at a temperature other than the reaction temperature is possible; however, the reaction product may change in an undesirable manner as described above during the temperature increase or decrease required for this purpose.

The time during which the discharge is in contact with the deactivator depends, inter alia, on the concentration of the boron trifluoride in the discharge, on the content of reactive nitrogen atoms in the deactivator and on the degree of occupation of the solid deactivator by the boron trifluoride. Usually, the deactivation is effective immediately when the deactivator has sufficient capacity. If the deactivator is arranged in a vertical bed and the discharge is passed through this bed, the required flow rate can be easily calculated and correspondingly established.

The phase remaining after the deactivation (eluate) contains the polyisobutene and furthermore usually the unconverted isobutene and low molecular weight polymers of isobutene and may contain the solvent used in the polymerization of the isobutene.

In a further preferred embodiment of the novel process, the activity of the boron trifluoride is predominantly eliminated in a first step in a manner known per se, i.e. without the use of the deactivator which has boron trifluoride-binding primary, secondary, tertiary and/or quaternary nitrogen atoms, usually all except from 0.001 to 10, preferably from 0.5 to 8, in particular from 1 to 5, % of the originally used amount of the boron trifluoride being deactivated and for this purpose, if required, being removed from the reaction mixture, and, in a second step, the remaining activity is eliminated by means of a deactivator which has boron trifluoride-binding primary, secondary, tertiary and/or quaternary nitrogen atoms. A liquid deactivator, such as water, an alcohol, an amine, a nitrile, sodium hydroxide solution or aqueous ammonia, is preferably used for the first stage of the deactivation. Owing to the lower residual amounts of boron trifluoride achieved by the pretreatment with another deactivator, smaller amounts of deactivator which have boron trifluoride-binding primary, secondary, tertiary and/or quaternary nitrogen atoms must be used, so that the price thereof and the complexity of the apparatus for their use are economical in comparison with the known disadvantages of the upstream deactivation by one of the processes known to a person skilled in the art.

Small residue amounts of boron trifluoride can, if desired, also be removed from the eluate by extraction, for example with alcohols, such as methanol, or preferably by washing with water.

In the further course of the working-up, the organic phase is expediently separated by distillation into unconverted isobutene, any solvent present, the low molecular weight polymers of isobutene and the desired product polyisobutene. The isobutene, the solvent and the low molecular weight polymers can be recycled, independently of one another or together, to the polymerization. The desired polyisobutene is as a rule removed as a bottom product from the gas removal.

Spent solid deactivator is generally regenerated for economic reasons. In practice, especially where it is wished to operate a continuous deactivation, it is expedient to continue the deactivation with a second batch or even further batches of solid deactivator and to operate the regeneration of spent deactivator preferably parallel thereto.

The regeneration of the deactivator can be effected in a manner known per se, for example by treatment with dilute, about 5% strength, sodium hydroxide solution. When aqueous alkalis are used, however, the boron trifluoride bound to the deactivator is usually completely hydrolyzed.

Water in very small amounts, alcohols, such as methanol or ethanol, or other compounds which form more stable adducts with the boron trifluoride than the solid deactivator, or other substances which displace the boron trifluoride from the solid deactivator, such as dilute acids, for example dilute sulfuric acid, are therefore preferably used for regenerating the solid deactivator. In this way, the boron trifluoride is generally removed, substantially undecomposed, from the deactivator. The boron trifluoride can be expelled from resulting aqueous eluates, for example with the aid of highly concentrated sulfuric acid (oleum), and can be isolated. For example, steam stripping is employed for removing organic components from the eluates, aqueous eluates being obtained, which in turn can be worked up with highly concentrated sulfuric acid (oleum) to obtain the boron trifluoride present.

A particular advantage of the novel deactivators over the known solid deactivators is that the boron trifluoride bound to the former no longer has any detectable catalytic activity under the conditions of the polyisobutene preparation, compared to isobutene.

Because the deactivation can furthermore be carried out as a rule at the temperature of the isobutene polymerization, the cooling energy applied for establishing the low temperatures of the polymerization can be particularly economically recovered, for example by means of heat exchangers, after the deactivation and before the further working-up of the reactor discharge.

EXAMPLES

The average molecular weights ($M_n$) of the polymers prepared according to the examples were determined by means of gel permeation chromatography, polyisobutenes having defined known average molecular weights being used for calibration. The number average molecular weight $M_n$ was calculated from the resulting chromatograms according to the equation $$M_n = \Sigma \frac{C_i}{\frac{C_i}{M_i}}$$

where $C_i$ is the concentration in each case of an individual polymer species i in the polymer mixture obtained and $M_i$ is the molecular weight of this individual polymer species i. The weight average molecular weight $M_w$ was obtained from the resulting chromatograms with the aid of the formula $$M_W = \frac{\Sigma C_1 M_1}{\Sigma C_i}.$$

The dispersity D was calculated from the ratio of weight average molecular weight ($M_w$) to the number average molecular weight ($M_n$) according to the equation $$D = \frac{M_w}{M_n}.$$

The content of terminal vinylidene groups was determined with the aid of $^{13}$C-NMR spectroscopy, deuterated chloroform being used as the solvent and tetramethylsilane as the standard.

Example 1

Preparation of Highly Reactive Polyisobutene

For the preparation of a polyisobutene, the procedure according to EP-A 628 575, Example 1, was employed: the isobutene feedstock used was a $C_4$ cut having the following composition:

| | |
|---|---|
| isobutane | 4.0% by weight |
| n-butane | 9.2% by weight |
| 1-butene | 29.0% by weight |
| trans-2-butene | 7.7% by weight |
| cis-2-butene | 4.5% by weight |
| isobutene | 45.4% by weight |
| butadiene | <50 ppm |
| water | about 2 ppm. |

In the course of one hour, 6 000 g of the above $C_4$ cut were fed to the suction side of a loop reactor equipped with an integrated circulation pump whose pipe diameter was 4 mm and whose volume was 1 000 ml. 1.6 times the molar amount, based on the boron trifluoride, of 2-butanol was added. The reactor was cooled so that the temperature in the reaction medium was −15° C. The average residence time of the reaction medium in the reactor was 6.6 minutes. Samples of the reactor content were removed via a sampling apparatus, which was positioned 2 cm in front of the feed for the starting materials.

Examples 2 to 5

Deactivation and Working-up

The solid deactivator was initially taken in a closeable, pressure-stable glass sampling vessel. The sample of 50 ml was added in the course of a few seconds at −15° C. with thorough mixing and stirring was continued at this temperature for a further 30 minutes. The mixture was heated to +20° C. in the subsequent 60 minutes with stirring by means of a magnetic stirrer in the closed glass sampling vessel. Thereafter, the deactivator was separated off and the remaining organic phase was washed with 167 g of water. After the aqueous phase had been separated off, the solvent was distilled off, and the analytical data listed in Table 1 were determined for the residue of the distillation.

In Table 1, the meanings are as follows:

TABLE 1

| | | Deactivator | | | | | | | |
|---|---|---|---|---|---|---|---|---|---|
| No. | $BF_3$ [mmol/l] | Substance | Amount [g] | Amount [meq.[4)]] | C [%] | Y [%] | Vin [%] | $M_n$ | D |
| 1 | 19.8 | Dowex MWA-1[1)] | 5 | 12.7 | 98 | 95 | 87.6 | 981 | 1.678 |
| 2 | 19.8 | — | — | — | 99 | 95 | 82.6 | 903 | 1.806 |
| 3 | 7.1 | Lewatit 500[2)] | 5 | 12.7 | 94 | 93 | 78.1 | 2477 | 1.734 |
| 4 | 7.1 | Polyvinyl alcohol[3)] | 5 | — | 98 | 93 | 78.3 | 1408 | 2.692 |

$BF_3$ "Content of $BF_3$ in the sample": The amount of $BF_3$ added to the reaction of the isobutene was taken as the basis
C Conversion in percent, based on isobutene used
Y Yield of polyisobutene, based on isobutene used
Vin Proportion of polyisobutene having vinylidene double bonds, based on the total polyisobutene yield
$M_n$ Average molecular weight (determined by means of gel permeation chromatography)
D Dispersity
[1)]Weakly basic ion exchanger from Dow Chemicals in the amine form
[2)]Strongly basic ion exchanger from Bayer AG in the OH form
[3)]99% hydrolyzed, molecular weight 124,000–186,000, from Aldrich
[4)]= Milliequivalents

Example 6

Continuous Deactivation

The discharge from Example 1 was passed continuously, at a flow rate of 2 liters/h at from −25 to −5° C., through a glass column with an internal volume of 100 ml and was filled with 50 g of weakly basic ion exchanger Dowex MWA-1 (from Dow; amine form; 2.5 meq. of reactive amino groups/g). The eluate was collected liter by liter. The analysis gave the following contents of inorganic fluoride in the eluates, the value for the untreated discharge being 612 mg of inorganic fluoride per kg of discharge:

| Eluate | Total content of inorganic fluoride (according to Wickbold*) [mg/kg of eluate] | Relative decrease in the content of inorganic fluoride [%] |
|---|---|---|
| 1st eluate | 128 | 79 |
| 2nd eluate | 111 | 82 |
| 3rd eluate | 106 | 83 |
| 4th eluate | 79 | 87 |
| 5th eluate | 62 | 90 |
| 6th eluate | 73 | 88 |
| 7th eluate | 71 | 88 |
| 8th eluate | 64 | 90 |
| 9th eluate | 65 | 89 |
| 10th eluate | 62 | 90 |
| 11th eluate | 118 | 81 |
| 12th eluate | 59 | 90 |
| 13th eluate | 45 | 93 |
| 14th eluate | 259 | 58 |

*Principle: concentration and combustion of the respective eluate fraction, followed by an electrophoretic fluoride determination

Example 7

Continuous Deactivation

Example 7 was carried out analogously to Example 6, but with strongly basic ion exchanger Lewatit M 500 (from Bayer AG; OH form; 1.7 meq. of reactive amino groups/g) at a flow rate of 4 liters/h. The value for the untreated discharge was 612 mg of inorganic fluoride per kg of discharge.

| Eluate | Total content of inorganic fluoride (according to Wickbold) [mg/kg of eluate] | Relative decrease in the content of inorganic fluoride [%] |
|---|---|---|
| 1st eluate | 159 | 85 |
| 2nd eluate | 137 | 87 |
| 3rd eluate | 122 | 88 |
| 4th eluate | 256 | 76 |
| 5th eluate | 95 | 91 |
| 6th eluate | 96 | 91 |
| 7th eluate | 94 | 91 |
| 8th eluate | 124 | 88 |
| 9th eluate | 120 | 89 |
| 10th eluate | 135 | 87 |
| 11th eluate | 158 | 85 |

Example 8

Regeneration of the Deactivator

The spent ion exchanger from Example 6 was treated at 20° C. in succession three times with water and seven times with 5% strength by weight sodium hydroxide solution in the same glass column. The eluates were analyzed to determine inorganic fluoride and tetrafluoroborate.

| Eluate | Total content of inorganic fluoride (according to Wickbold) [mg/kg of eluate] | Total content of tetrafluoroborate [mg/kg eluate] |
|---|---|---|
| Eluate of 70 ml of water | 600 | 590 |
| Eluate of 70 ml of water | 125 | 115 |
| Eluate of 70 ml of water | 70 | 50 |
| Eluate of 100 ml of sodium hydroxide solution | 4400 | 25400 |
| Eluate of 100 ml of sodium hydroxide solution | 625 | 14100 |
| Eluate of 100 ml of sodium hydroxide solution | 55 | 770 |
| Eluate of 100 ml of sodium hydroxide solution | <30 | 300 |
| Eluate of 100 ml of sodium hydroxide solution | <30 | 275 |
| Eluate of 100 ml of sodium hydroxide solution | <30 | 200 |
| Eluate of 100 ml of sodium hydroxide solution | <30 | 160 |

We claim:

1. A process for the preparation of polyisobutenes by cationic polymerization of isobutene or isobutene-containing hydrocarbon streams in the liquid phase in the presence of boron trifluoride as a catalyst, the catalytic activity of the boron trifluoride being reduced partially or fully eliminated at a desired time by means of a solid deactivator, wherein the solid deactivator is insoluble in the reaction mixture and has pendant, boron trifluoride-binding primary, secondary, tertiary amine groups and/or quaternary ammonium ions bound to a carriers, wherein the primary amino groups are derived from primary amines of the formula: $R^1$—$NH_2$, the secondary amino groups are derived from secondary amines of the formula: $R^2R^3$—NH, the tertiary amino groups are derived from tertiary amines of the formula: $R^4R^5R^6$—N and the quaternary ammonium ions are derived from quaternary ammonium ions of the formula: $R^7R^8R^9R^{10}$—$N^+$, wherein $R^1$, at least one of $R^2$ and $R^3$, at least one of $R^4$ to $R^6$ and at least one of $R^7$ to $R^{10}$ are bound to said carrier with the R groups being $C_1$–$C_{10}$-alkyl, $C_6$–$C_{10}$-aryl, $C_7$–$C_{15}$-arylalkyl or $C_1$–$C_8$-alkylcarbonyl.

2. The process as claimed in claim 1, wherein the activity of the boron trifluoride is predominantly reduced in a manner known per se in a first step and, in a second step, the remaining activity is eliminated by means of a solid deactivator which has pendant, boron trifluoride-binding primary, secondary, tertiary amine groups and/or quaternary ammonium ions bound to a carrier.

3. The process as claimed in claim 1, for the preparation of highly reactive polyisobutene having from 75 to 100 mol % of terminal double bonds.

4. The process as claimed in claim 1, wherein the polyisobutene product has an average molecular weight ranging from 300 to 50,000 Dalton.

5. The process as claimed in claim 1, wherein the solid deactivator is an ion exchanger.

6. The process as claimed in claim 1, wherein the boron trifluoride-containing catalyst system contains one or more alcohols.

7. The process as claimed in claim 1, wherein the boron trifluoride-containing catalyst system contains methanol or isopropanol.

8. The process as claimed in claim 1, wherein the catalytic activity of the boron trifluoride is continuously reduced by means of the solid deactivator.

9. The process as claimed in claim 1, wherein the carrier is an inorganic or organic material.

10. The process as claimed in claim 1, wherein the deactivator is an aminated polymer.

11. The process as claimed in claim 5 wherein the ion exchanger is weakly basic.

12. The process as claimed in claim 1, wherein the deactivation of the boron trifluoride occurs at a temperature of 0 to −30° C.

13. The process as claimed in claim 1, wherein the deactivation of the boron trifluoride occurs at a temperature of 0 to −25° C.

14. The process as claimed in claim 2, wherein the activity of the boron trifluoride is reduced to a residual 0.001 to 10% by weight amount of the original amount of boron trifluoride.

15. The process as claimed in claim 2, wherein the activity of the boron trifluoride is reduced to a residual 0.5 to 8% by weight amount of the original amount of boron trifluoride.

* * * * *